US 6,659,265 B2

(12) United States Patent
Pfeilschifter et al.

(10) Patent No.: US 6,659,265 B2
(45) Date of Patent: Dec. 9, 2003

(54) APPARATUS FOR THE TRANSFER OF PLATES FROM A PLATE TRANSPORT DEVICE TO A PLATE STORAGE RACK OR SIMILAR DEVICE

(75) Inventors: Thomas Pfeilschifter, Kalsheim (DE); Edwin Lang, Rain./Lech (DE)

(73) Assignee: Grenzebach Maschinenbau GmbH, Asbach-Bäumenheim Hamlar (DE)

( * ) Notice: Subject to any disclaimer, the term of this patent is extended or adjusted under 35 U.S.C. 154(b) by 0 days.

(21) Appl. No.: 10/253,583

(22) Filed: Sep. 24, 2002

(65) Prior Publication Data

US 2003/0062245 A1 Apr. 3, 2003

(30) Foreign Application Priority Data

Sep. 28, 2001 (DE) .......................................... 101 48 038

(51) Int. Cl.[7] ............................................... B65G 57/08
(52) U.S. Cl. ............................ 198/468.6; 198/468.1; 414/737; 907/7
(58) Field of Search ........................ 198/396.1, 468.4, 198/468.6, 468.1, 475.1; 414/737; 901/7

(56) References Cited

U.S. PATENT DOCUMENTS

| 3,563,377 | A | * | 2/1971 | Southcott ..................... 198/25 |
| RE28,609 | E | | 11/1975 | Malburet |
| 4,135,619 | A | * | 1/1979 | Cerboni ....................... 198/477 |
| 4,228,886 | A | * | 10/1980 | Moran ......................... 198/395 |
| 4,494,902 | A | * | 1/1985 | Kuppens et al. ............. 414/223 |
| 4,623,296 | A | * | 11/1986 | McGuire et al. ............. 414/730 |
| 4,806,070 | A | * | 2/1989 | Poux et al. .................. 414/752 |
| 4,885,833 | A | * | 12/1989 | Umegai et al. ................ 29/407 |
| 5,004,399 | A | * | 4/1991 | Sullivan et al. ............. 414/729 |
| 5,330,311 | A | * | 7/1994 | Cawley et al. .............. 414/416 |
| 5,403,056 | A | * | 4/1995 | Wallace ....................... 294/98.1 |
| 5,681,138 | A | * | 10/1997 | Lust et al. ................... 414/225 |
| 6,220,424 | B1 | * | 4/2001 | Fluck ....................... 198/468.6 |

FOREIGN PATENT DOCUMENTS

| DE | 44 01 510 | 11/1995 |
| DE | 195 20 349 | 12/1996 |
| DE | 198 21 677 | 11/1999 |

* cited by examiner

Primary Examiner—Douglas Hess
(74) Attorney, Agent, or Firm—Klaus J. Bach

(57) ABSTRACT

In an apparatus for the transport of plates from a plate transport device to a plate storage rack or similar device, including a robotic arm having at its free end a plate engagement structure, the plate transport device is provided with a recess over which the plate can be centered and into which the plate engagement structure can be moved to engage the plate from the bottom side thereof and lift an remove the plate from the plate transport device.

1 Claim, 3 Drawing Sheets

APPARATUS FOR THE TRANSFER OF PLATES FROM A PLATE TRANSPORT DEVICE TO A PLATE STORAGE RACK OR SIMILAR DEVICE

BACKGROUND OF THE INVENTION

The invention relates to an apparatus for the transfer of a plates, particularly glass plates, from a plate transport device to a plate support rack or a similar structure.

During the manufacture of flat glass, a flat continuously moving glass plate strip is formed by depositing the glass melt onto a liquid metal bath. After sufficient cooling and hardening, the flat glass strip reaches a cutting station, where the glass strip is cut into sections of the desired format to form panels. These panels or glass plates are then transported by a conveyor to stacking stations where they are stacked onto a rack for the transport or for further processing.

If the glass panels or plates are subsequently coated in order to provide certain properties such as light transparency, light reflection, or optical appearance, or heat-ray transparency, as is often desired for glass panels used in the construction of buildings, the side of the glass panel to be coated needs to be kept free of contaminants and impairments of any kind. For this purpose, preferably the air side of the glass panel is used (in contrast to the bath side with which the glass plate swims on the liquid metal bath during the manufacturing procedure), which is not subjected to mechanical influences during the transport to the stacking station, whereas the bath side is in contact with the transport rollers of the panel transport device. At the stacking station, however, the glass panels are engaged at the air side by a suction frame disposed at the end of a robot arm and they are lifted from the transport device and deposited on a rack.

It is the object of the present invention to provide an apparatus for the transfer of panels from a transport device to a storage rack in such a way that the top surface of the panels, that is the air side of a glass plate, is not detrimentally affected by the transfer procedure.

SUMMARY OF THE INVENTION

In an apparatus for the transport of plates from a plate transport device to a plate storage rack or similar device, including a robotic arm having at its free end a plate engagement structure, the plate transport device is provided with a recess over which the plate can be centered and into which the plate engagement structure can be moved to engage the plate from the bottom side thereof and to lift and remove the plate from the plate transport device.

Accordingly, the transfer device is so designed that, for the removal of a glass panel from the panel transport device, the suction frame will not engage the top, that is, the air side of the glass panel, but will engage the glass panel from the bottom, that is, bath side. In this way, the air side of a glass panel is not detrimentally subjected to contaminations nor is it affected by the transfer from the transport device to the storage rack.

The apparatus according to the invention is particularly suitable for the handling of glass panels, but may also be used advantageously for the handling of other plates with similar needs such as the handling of sensitive plates of metal, plastic or other materials, which are coated at their top sides or otherwise provided with a high-quality surface.

The invention will be described below in greater detail on the basis of the accompanying drawings.

DESCRIPTION OF A PREFERRED EMBODIMENT

Figure 1:
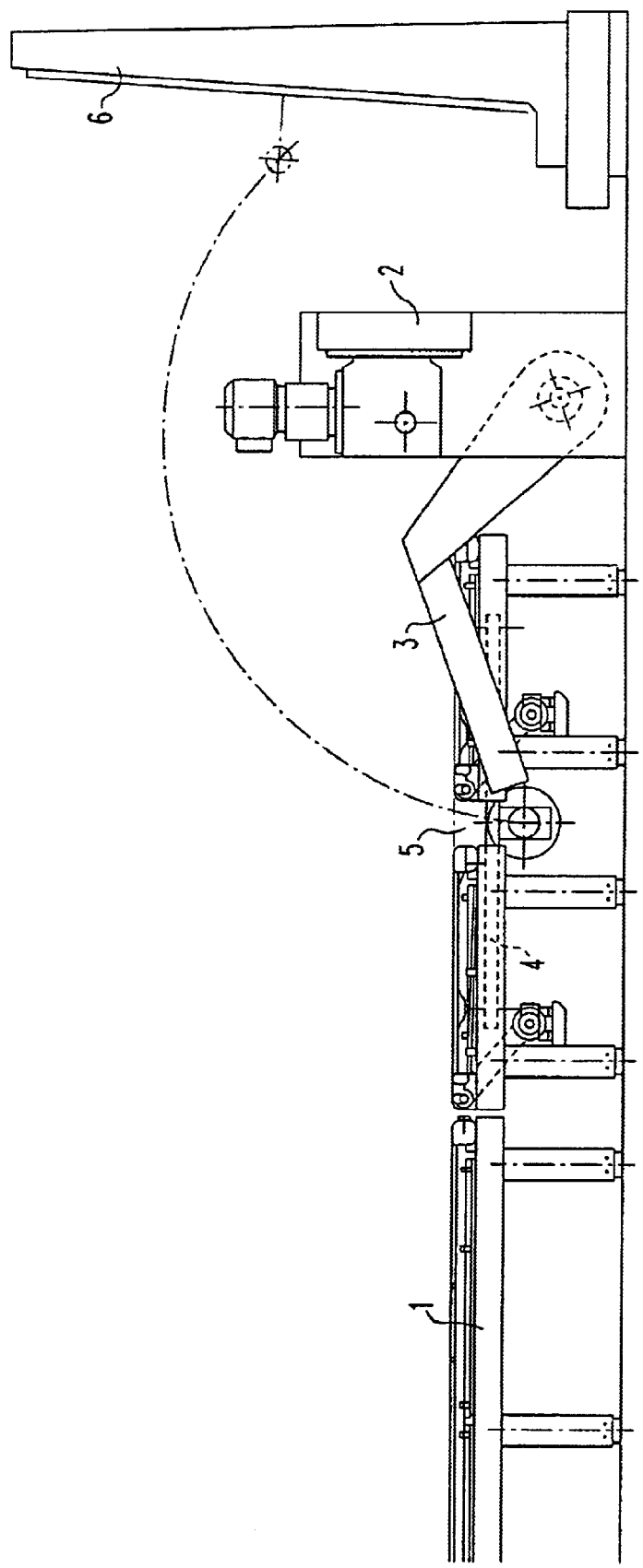
FIG. 1 is a side view of a transport apparatus according to the invention disposed at the end of a plate transport apparatus.

As shown in the figures, a transfer apparatus arranged at the end of a transport device 1, comprises a robot 2 with a robotic arm 3, which has a number of degrees of freedom of movement and carries at its free end a suction frame 4.

The plate transport device 1 is provided in the range of the robotic arm 3 at the respective side adjacent the robotic arm 3 with a recess 5 which makes it possible for the robotic arm 3 with all its components to enter below a plate disposed on the transport device.

Figure 3:
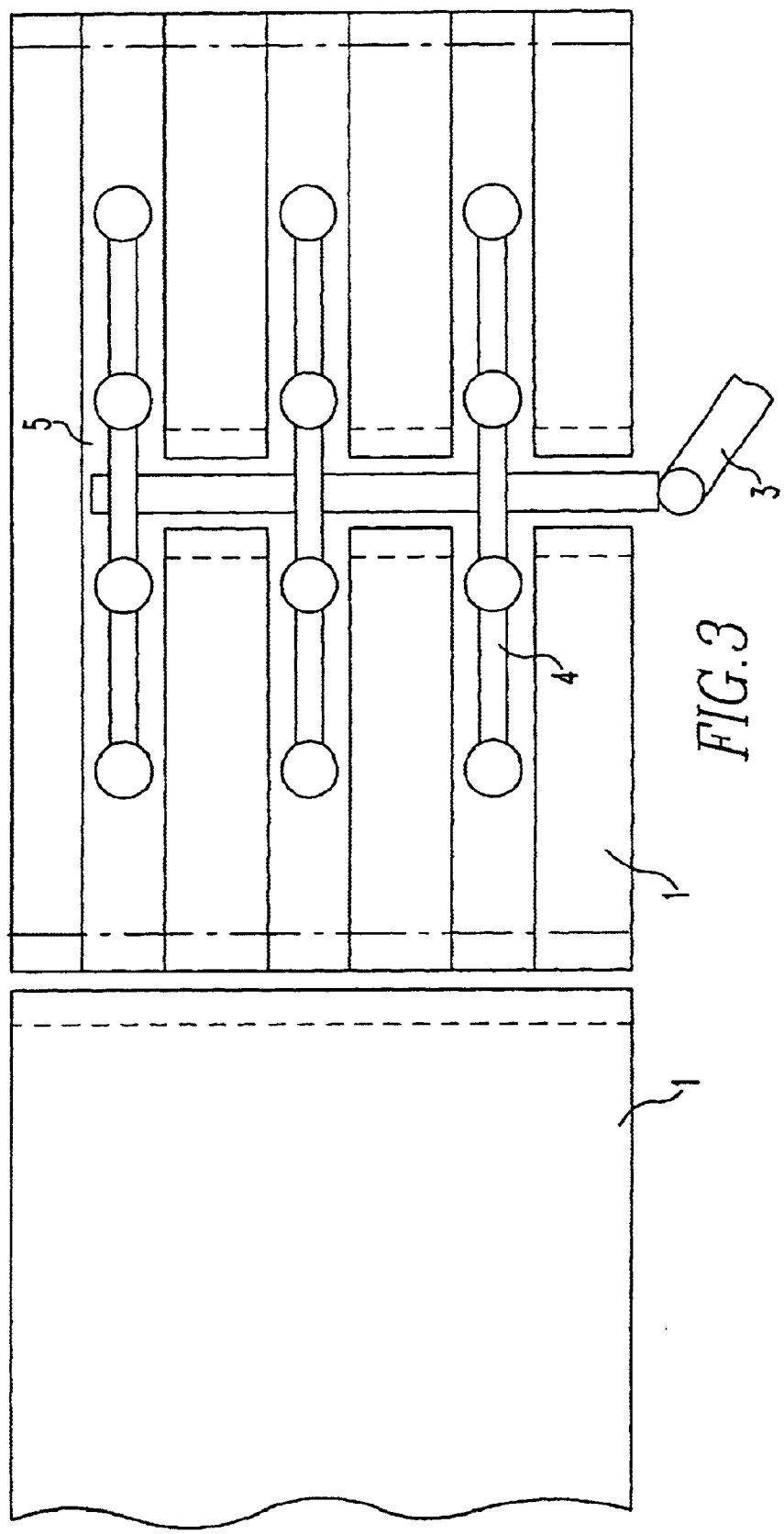
FIG. 3 is a top view of part of the transport apparatus as shown in FIG. 1.

FIG. 1 shows the arrangement with the robot 2, 3, 4 ready for the transfer of a glass panel from the plate transfer device. In this position, the suction frame 4 is oriented so that the suction cups of the suction frame point upwardly. The end of the robot arm 3 carrying the suction frame 4 is disposed in this position under the suction frame 4. The end area of the robotic arm 3 with the suction frame 4 disposed thereon is received in this position in the recess of the plate transport device 1 (FIG. 3). An arriving glass panel consequently moves on the transport device 1 over the suction frame 4 received in the recesses 5 up to its end position in which the panel is about centered over the suction frame. Then, the suction frame can, from its location in the recess, engage with its suction cups the underside of the panel disposed on the transport device which represents the bath side of the glass panel and the robot 2 can then move the robot arm 3 out of its position in the recesses in the transport device 1 in order to transfer the glass panel to a storage rack 6.

Figure 2:
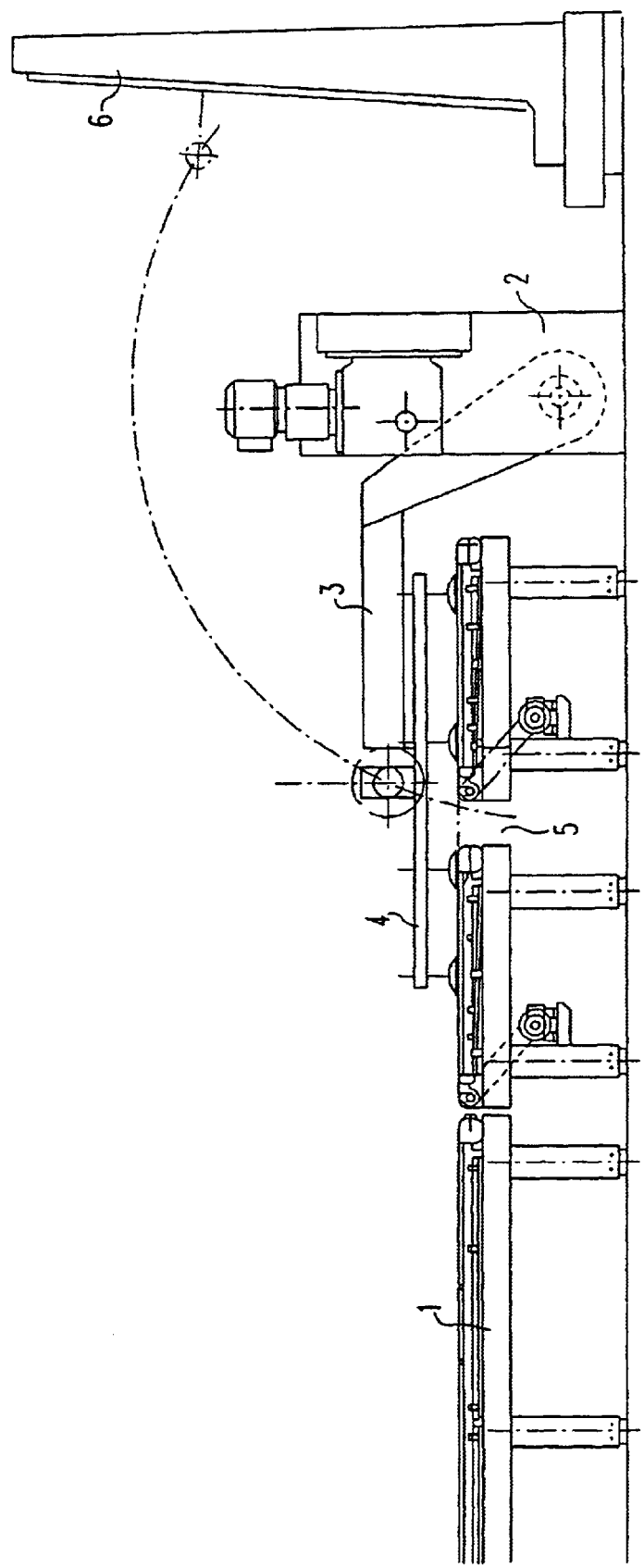
FIG. 2 is a view similar to that of FIG. 1 showing the transfer apparatus in another operating position.

FIG. 2 shows the arrangement with the robot in another operating position wherein the robot arm 3 with the suction frame 4 is not disposed in the recesses of the plate transport device 1, but is disposed above the transport device 1. The suction frame 4 is pivoted in this case into a position in which the suction cups point downwardly toward the plate transport device 4. The suction frame 4 can consequently also engage the glass panels from the air side thereof. The apparatus according to the invention is consequently capable of selectively engaging the glass panels from the bath side thereof when the robot arm extends into a recess in the transport device below the glass panel and also of engaging the glass panel from the air side thereof that is from a position above the plate transport device.

What is claimed is:

1. An apparatus for the transport of plates from a plate transport device to a plate storage rack or similar device, including a robotic arm having a free end, a plate engagement structure comprising a suction frame provided with suction means arranged at the free end of said robotic arm for engaging a plate and removing it from said plate transport device, said plate transport device including a recessed area over which a plate on said plate transport device can be moved and which is adapted to receive said free end of said robotic arm with said plate engagement structure for the engagement of said plate from the bottom side thereof and for lifting and removing said plate from said plate transport device, said robotic arm having sufficient degrees of freedom of movement so that said suction frame can also be rotated to face downwardly and engage a plate from the top surface thereof and for moving said plate also in an essentially vertical position to a storage or transport rack.

* * * * *